(12) United States Patent
Kim et al.

(10) Patent No.: US 11,336,153 B2
(45) Date of Patent: May 17, 2022

(54) MOTOR

(71) Applicant: LG INNOTEK CO., LTD., Seoul (KR)

(72) Inventors: Tae Ho Kim, Seoul (KR); Nam Hoon Kim, Seoul (KR); Ja Young Seo, Seoul (KR); Jin Su Pyeon, Seoul (KR)

(73) Assignee: LG INNOTEK CO., LTD., Seoul (KR)

(*) Notice: Subject to any disclaimer, the term of this patent is extended or adjusted under 35 U.S.C. 154(b) by 233 days.

(21) Appl. No.: 16/483,867

(22) PCT Filed: Feb. 6, 2018

(86) PCT No.: PCT/KR2018/001554
§ 371 (c)(1),
(2) Date: Aug. 6, 2019

(87) PCT Pub. No.: WO2018/143764
PCT Pub. Date: Aug. 9, 2018

(65) Prior Publication Data
US 2020/0014286 A1    Jan. 9, 2020

(30) Foreign Application Priority Data

Feb. 6, 2017 (KR) .................. 10-2017-0016230
Feb. 9, 2017 (KR) .................. 10-2017-0018074

(51) Int. Cl.
*H02K 11/01* (2016.01)
*H02K 5/22* (2006.01)
*H02K 11/40* (2016.01)

(52) U.S. Cl.
CPC ......... *H02K 11/0141* (2020.08); *H02K 5/225* (2013.01); *H02K 11/40* (2016.01)

(58) Field of Classification Search
CPC .... H02K 5/225; H02K 11/0141; H02K 11/40; H02K 5/15
(Continued)

(56) References Cited

U.S. PATENT DOCUMENTS 4,656,378 A * 4/1987 Atherton ............. H01R 4/2462
310/68 C
4,798,984 A * 1/1989 Suzuki .................. H02K 5/225
310/68 C
(Continued)

FOREIGN PATENT DOCUMENTS

CN         1428918 A      7/2003
CN       101153793 A      4/2008
(Continued)

OTHER PUBLICATIONS

Supplementary Partial European Search Report dated Nov. 5, 2020 in European Application No. 18748194.0.
(Continued)

*Primary Examiner* — Burton S Mullins
(74) *Attorney, Agent, or Firm* — Saliwanchik, Lloyd & Eisenschenk

(57) ABSTRACT

The present invention may provide a motor including a housing; a stator disposed in the housing; a rotor disposed in the stator; a shaft coupled to the rotor; and a wire assembly connected to the stator, wherein the wire assembly includes a first ground part, the housing includes a body and a bracket including a first fastening hole and disposed on an upper portion of the body, and the bracket includes a third ground part, which is inserted into the first fastening hole and thereby contacts the body, and a second ground part, which is connected to the third ground part and is disposed so as to be exposed to the bottom surface of the bracket and thereby contacts the first ground part.

7 Claims, 11 Drawing Sheets

(58) Field of Classification Search
USPC .......................................................... 310/71
See application file for complete search history.

(56) References Cited

U.S. PATENT DOCUMENTS

| | | | | |
|---|---|---|---|---|
| 5,596,237 | A * | 1/1997 | Daniels | H02K 5/225 |
| | | | | 310/71 |
| 6,528,913 | B1 * | 3/2003 | Michaels | H02K 3/50 |
| | | | | 310/71 |
| 6,836,038 | B2 * | 12/2004 | Noda | H02K 11/0141 |
| | | | | 310/71 |
| 6,987,338 | B1 * | 1/2006 | Lavasser | A47L 5/12 |
| | | | | 15/412 |
| 7,151,333 | B2 * | 12/2006 | Suzuki | H02K 5/225 |
| | | | | 310/71 |
| 9,270,060 | B2 * | 2/2016 | Adachi | H01R 13/6596 |
| 9,692,278 | B2 * | 6/2017 | Buerger | H02K 11/026 |
| 9,806,454 | B2 * | 10/2017 | Nakai | B60R 16/0222 |
| 9,991,644 | B2 * | 6/2018 | Kang | H02K 5/225 |
| 2002/0134565 | A1 | 9/2002 | Hashizawa et al. | |
| 2004/0057187 | A1 | 3/2004 | Kuboshima et al. | |
| 2008/0073987 | A1 | 3/2008 | Kataoka et al. | |
| 2015/0380887 | A1 | 12/2015 | Jang et al. | |
| 2016/0069353 | A1 * | 3/2016 | Humburg | F04D 23/008 |
| | | | | 417/423.7 |

FOREIGN PATENT DOCUMENTS

| | | |
|---|---|---|
| DE | 19858207 A1 | 6/2000 |
| KR | 10-1527679 B1 | 6/2015 |
| KR | 10-2015-0077867 A | 7/2015 |
| KR | 10-2016-0137009 A | 11/2016 |
| KR | 10-2017-0011144 A | 2/2017 |
| WO | WO 2014083791 A1 * | 6/2014 ............. H02K 3/522 |

OTHER PUBLICATIONS

Office Action dated Sep. 1, 2020 in Chinese Application No. 201880010508.6.
International Search Report in International Application No. PCT/KR2018/001554, filed Feb. 2, 2018.
Office Action dated Feb. 1, 2022 in Japanese Application No. 2019-542381.

* cited by examiner

MOTOR

CROSS-REFERENCE TO RELATED APPLICATIONS

This application is the U.S. national stage application of International Patent Application No. PCT/KR2018/001554, filed Feb. 6, 2018, which claims the benefit under 35 U.S.C. § 119 of Korean Application Nos. 10-2017-0016230, filed Feb. 6, 2017; and 10-2017-0018074, filed Feb. 9, 2017; the disclosures of each of which are incorporated herein by reference in their entirety.

TECHNICAL FIELD

Embodiments are related to a motor.

BACKGROUND ART

An electronic power steering (EPS) device is a device capable of ensuring the turning stability of a vehicle and providing quick restoring force, thereby enabling a driver to drive safely. Such an EPS device controls driving of a steering shaft of a vehicle by driving a motor through an electronic control unit (ECU) according to driving conditions sensed by a vehicle speed sensor, a torque angle sensor, a torque sensor, and the like.

The motor includes a housing. The housing includes a body and a bracket. The body accommodates a rotor and a stator therein. The bracket covers an open upper portion of the body. The bracket is provided with an accommodation portion that accommodates a wire assembly. The bracket is generally formed of a metal material such as aluminum but may be formed of a plastic resin which is injection-molded to include a bearing at a center thereof. However, a bracket formed of a plastic resin has a critical problem that current does not flow and thus electromagnetic interference (EMI) cannot be shielded.

A separate component that conducts electric current may be additionally coupled to the bracket so as to shield EMI. Thus, the structure of the bracket is complicated. In addition, a ground fault may occur between the wire assembly and the bracket.

Furthermore, the bracket is generally formed of a metal material such as aluminum but may be formed of a plastic resin which is injection-molded to include a bearing at a center thereof. However, a bracket formed of a plastic resin has a problem that a current does not flow and thus EMI cannot be shielded.

DISCLOSURE

Technical Problem

To address the above problems, embodiments are directed to providing a motor capable of shielding electromagnetic interference (EMI) in a bracket formed of a plastic resin.

Embodiments are also directed to providing a motor, a structure of which may be simplified by omitting a separate component for shielding EMI.

Embodiments are also directed to providing a motor capable of shielding EMI in a bracket formed of a plastic resin.

Technical Solution

One aspect of embodiments provides a motor including a housing, a stator provided in the housing, a rotor provided in the stator, a shaft engaged with the rotor, and a wire assembly coupled to the stator. The wire assembly includes a first grounding portion. The housing includes a body and a bracket including a first fastening hole and provided on an upper portion of the body. The bracket includes a third grounding portion inserted into the first fastening hole to be in contact with the body; and a second grounding portion connected to the third grounding portion and disposed to be exposed on a lower surface of the bracket so as to be in contact with the first grounding portion.

The bracket may include a second fastening hole, and the bracket may include a fourth grounding portion connected to the second grounding portion and inserted into the second fastening hole to be in contact with an external device.

Each of the third grounding portion and the fourth grounding portion may include a hole through which a fastening member passes.

The third grounding portion and the fourth grounding portion may be disposed at different positions in a height direction with respect to the second grounding portion.

The bracket may include an accommodation portion that accommodates the wire assembly, and the second grounding portion may be provided in the accommodation portion.

The first fastening hole may be provided at a side of the accommodation portion, and the second fastening hole may be provided at another side of the accommodation portion.

The third grounding portion may be provided at a side of the second grounding portion, and the fourth grounding portion may be provided at another side of the second grounding portion.

The wire assembly may include a grommet into which a cable is inserted, and the first grounding portion may be provided to be exposed on an upper surface of the grommet.

The bracket may include a bearing at a central portion of the bracket.

Another aspect of embodiments provides a motor including a housing, a stator provided in the housing, a rotor provided in the stator, a shaft engaged with the rotor, and a wire assembly coupled to the stator. The housing includes a body and a bracket provided on an upper portion of the body. The body may include a protruding portion in contact with the wire assembly. The protruding portion extends upward from an upper surface of the body.

The wire assembly may include a cable connected to the stator, and a grommet on which the cable is disposed. The grommet may include a hole provided in a lower surface of the grommet.

The cable may include a core, and a shield layer provided at an outer side of the core. The shield layer may be exposed to the outside via the hole, and the protruding portion may be in contact with the shield layer.

The body may include an extending portion extending from an upper end of the body to an outer side of the body, and the protruding portion may be provided on the extending portion.

The bracket may include an accommodation portion provided on an upper portion of the extending portion to accommodate the wire assembly.

The grommet may include an upper cover portion and a lower cover portion. The upper cover portion protrudes from an upper surface of the grommet to be in contact with a side surface of the bracket, and the lower cover portion protrudes from a lower surface of the grommet to be in contact with a side surface of the extending portion.

The stator may include a stator core and a coil wound around the stator core. The coil may be connected to a terminal, and the terminal may be electrically connected to the wire assembly.

The cable disposed to pass through the grommet may be connected to a connection terminal, and the connection terminal may be connected to the terminal.

Advantageous Effects

According to embodiments, a grounding part connected to either a body of a housing which is formed of a metal material or a fastening part in contact with an external device is provided, and thus, an advantageous effect of shielding electromagnetic interference (EMI) even in a bracket formed of a plastic resin can be achieved.

According to embodiments, EMI can be shielded in a bracket formed of a plastic resin by simply configuring a grounding structure using fastening holes provided in the bracket.

According to embodiments, a shield layer is provided in a cable of a wire assembly to be in contact with a protruding portion of a housing so that a separate component for shielding EMI can be omitted, thereby simplifying the structure of a device.

According to embodiments, a housing and a wire assembly are connected to each other for grounding purposes, and thus, EMI can be shielded even in a bracket formed of a plastic resin.

According to embodiments, a protruding portion of a housing is coupled to a hole of a grommet of a wire assembly to provide a grounding structure while increasing adhesion between the housing and the wire assembly.

MODES OF THE INVENTION

Hereinafter, exemplary embodiments of the present invention will be described in detail. The object, specific advantages, and novel features of the present invention will become more apparent from the following detailed description and exemplary embodiments, taken in conjunction with the accompanying drawings. The terms or expressions used in the present specification and the claims should not be construed as being limited to that generally understood or defined in commonly used dictionaries, and should be understood according to the technical idea of the invention, based on the principle that the inventor(s) of the application can appropriately define the terms or expressions to optimally explain the invention. In the following description, well-known techniques related to the present invention are not described in detail when it is determined that they would obscure the invention due to unnecessary detail.

It will be understood that, although the terms "first," "second," "third," etc. may be used herein to describe various elements, these elements should not be limited by these terms. These terms are used only for the purpose of distinguishing one element from another element. For example, a second element discussed below could be termed a first element without departing from the scope of the invention. Similarly, the first element could be termed the second element. The terms "and/or" include any one or any combination of a plurality of related listed items.

Figure 1:
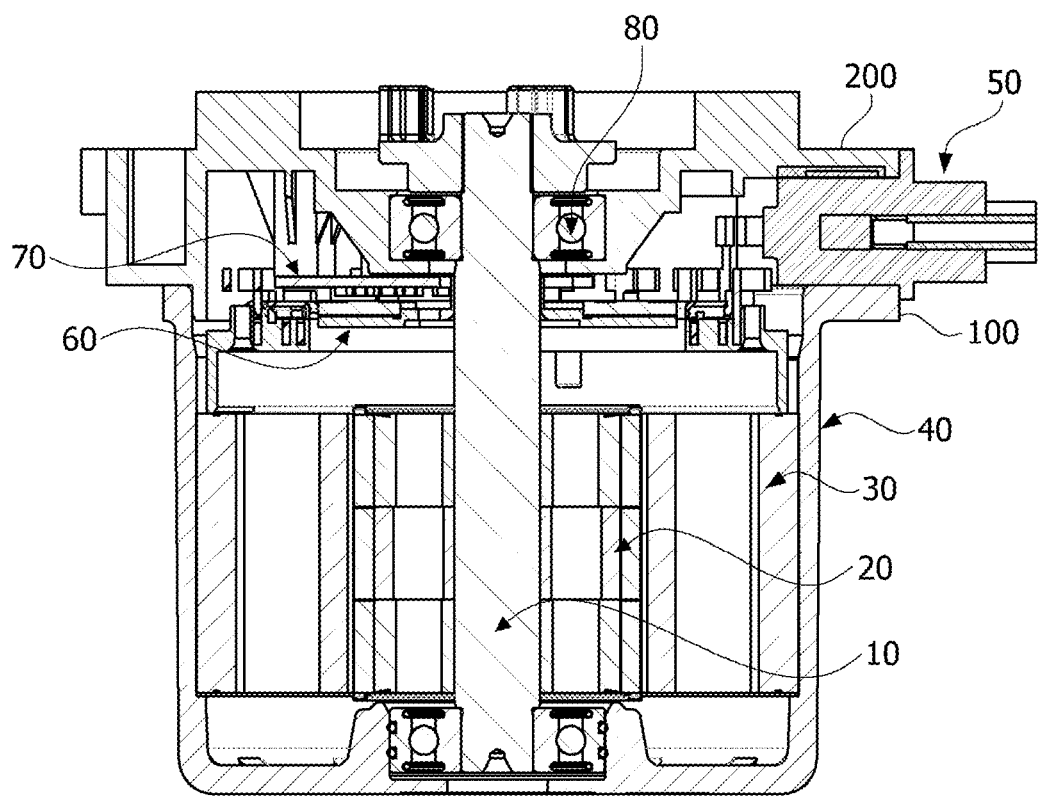
FIG. 1 is a side cross-sectional view of a motor according to an embodiment.
Figure 2:
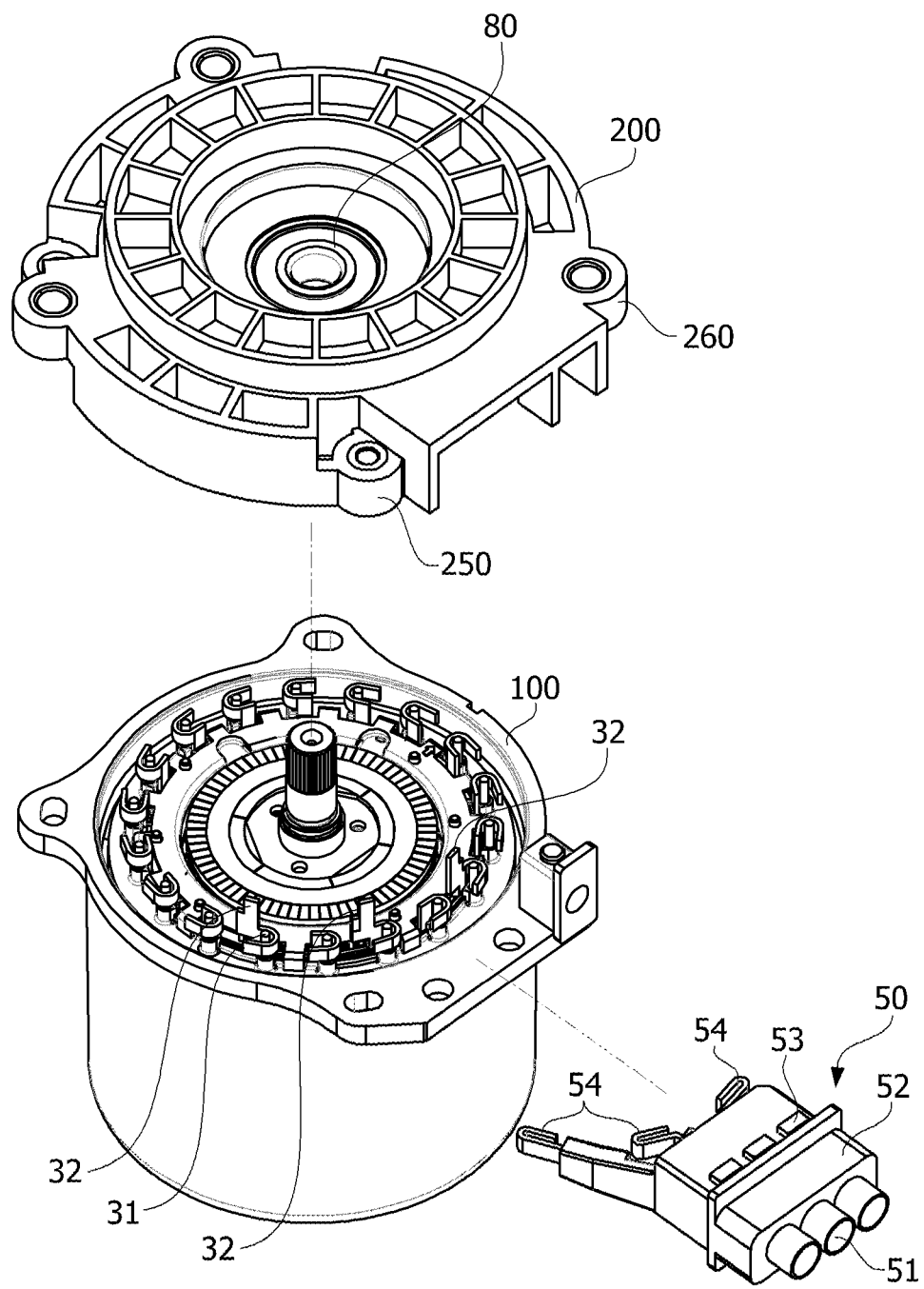
FIG. 2 is an exploded view of the motor of FIG. 1.

FIG. 1 is a side cross-sectional view of a motor according to an embodiment. FIG. 2 is an exploded view of the motor of FIG. 1.

Referring to FIGS. 1 and 2, the motor according to the embodiment may include a shaft 10, a rotor 20, a stator 30, a housing 40, and a wire assembly 50.

The shaft 10 may be coupled to the rotor 20. When power is supplied to cause electromagnetic interaction between the rotor 20 and the stator 30, the rotor 20 rotates and the shaft 10 rotates in connection therewith. The shaft 10 may be coupled to a steering shaft of a vehicle to transmit power to the steering shaft.

The rotor 20 rotates through electrical interaction with the stator 30.

The rotor 20 may include a rotor core and a magnet. The rotor core may be embodied in a stacked structure of a plurality of round thin steel plates or embodied in a cylindrical shape. A hole into which the shaft 10 is inserted may be formed at a center of the rotor core. A protrusion may protrude from an outer circumferential surface of the rotor core to guide the magnet. The magnet may be attached to the outer circumferential surface of the rotor core. A plurality of magnets may be disposed around a circumference of the rotor core at regular intervals. The rotor 20 may include a can member surrounding the magnet to fix the magnet so as not to be separated from the rotor core and to inhibit the magnet from being exposed.

A coil may be wound around the stator 30 to cause electrical interaction with the rotor 20. A specific configuration of the stator 30 for winding a coil around the stator 30 will be described below. The stator 30 includes a stator core with a plurality of teeth. The stator core is provided with a ring-shaped annular yoke portion and the plurality of teeth around which a coil is wound from a yoke toward a center of the stator core. The plurality of teeth may be provided at regular intervals along an outer circumferential surface of the yoke portion. The stator core may be formed by stacking a plurality of thin steel plates together. Alternatively, the stator core may be formed by coupling or connecting a plurality of divided cores to each other.

Coils 31 wound around the stator 30 are connected to terminals 32 having U, V, and W phases. The terminals 32 are electrically connected to the wire assembly 50.

The housing 40 may accommodate the rotor 20 and the stator 30 therein. The housing 40 may include a body 100 and a bracket 200 therein. The body 100 has a cylindrical shape. The body 100 may be formed of a metal material such as aluminum. An upper portion of the body 100 is open. The bracket 200 covers the open upper portion of the body 100. The stator 30 may be located inside the body 100, and the rotor 20 may be disposed inside the stator 30. The bracket 200 may be formed of a plastic resin. A bearing 80 may be disposed at a center of the bracket 200. The bearing 80 may be double-injection molded to be integrally formed with the bracket 200.

The wire assembly 50 is connected to the terminals 32 of FIG. 2 to supply a current to the coil 31 of FIG. 2. The wire assembly 50 may include three cables 51. The wire assembly 50 may further include a grommet 52 for accommodating the three cables 51. The wire assembly 50 includes a first grounding portion 53. The first grounding portion 53 is connected to the cables 51. The first grounding portion 53 is disposed to be exposed at an upper surface of the grommet 52. Each of the three cables 51 is connected to one of connection terminals 54. The connection terminals 54 are connected to the terminals 32 having the U, V and W phases of FIG. 2.

A sensing magnet 60 is a device coupled to the shaft 10 to operate in connection with the rotor 20 so as to sense a position of the rotor 20.

A sensor for sensing a magnetic force of the sensing magnet 60 may be disposed on a printed circuit board 70. In this case, the sensor may be a Hall integrated circuit (IC). The sensor senses a change of N and S poles of the sensing magnet 60 to generate a sensing signal.

Figure 3:
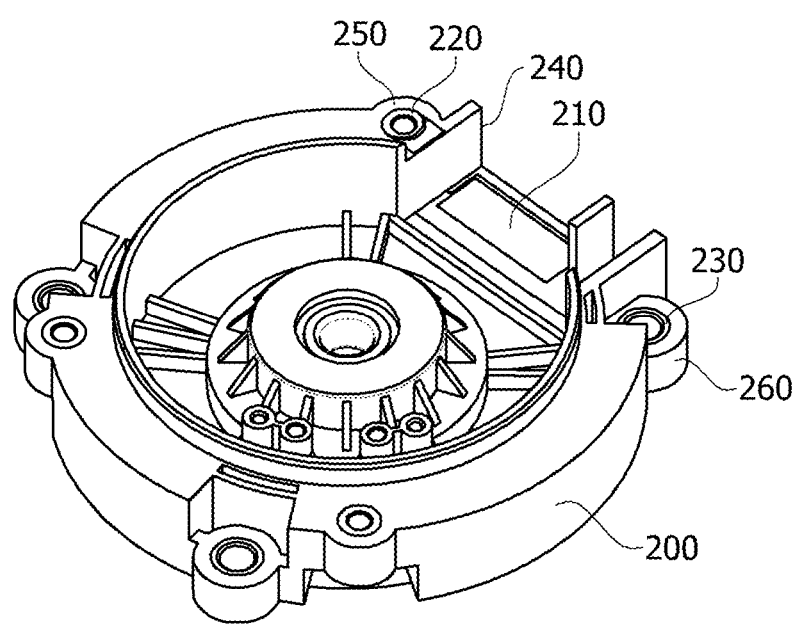
FIG. 3 is a bottom view of a bracket of a housing.

FIG. 3 is a bottom view of a bracket of a housing.

Referring to FIG. 3, the bracket 200 may include a second grounding portion 210, a third grounding portion 220, and a fourth grounding portion 230. The bracket 200 may further include an accommodation portion 240 for accommodating the wire assembly 50. A space into which the grommet 52 of the wire assembly 50 is inserted is secured using the accommodation portion 240.

The bracket 200 may include a first fastening hole 250 and a second fastening hole 260. The body 100 of the housing 40 is fastened to the first fastening hole 250. An electronic power steering (EPS) is fastened to the second fastening hole 260. A plurality of first fastening holes 250 and a plurality of second fastening holes 260 may be provided. One of the plurality of first fastening holes 250 may be provided in a side of the accommodation portion 240 with respect to the accommodation portion 240. One of the plurality of second fastening holes 260 may be provided in another side of the accommodation portion 240.

Figure 4:
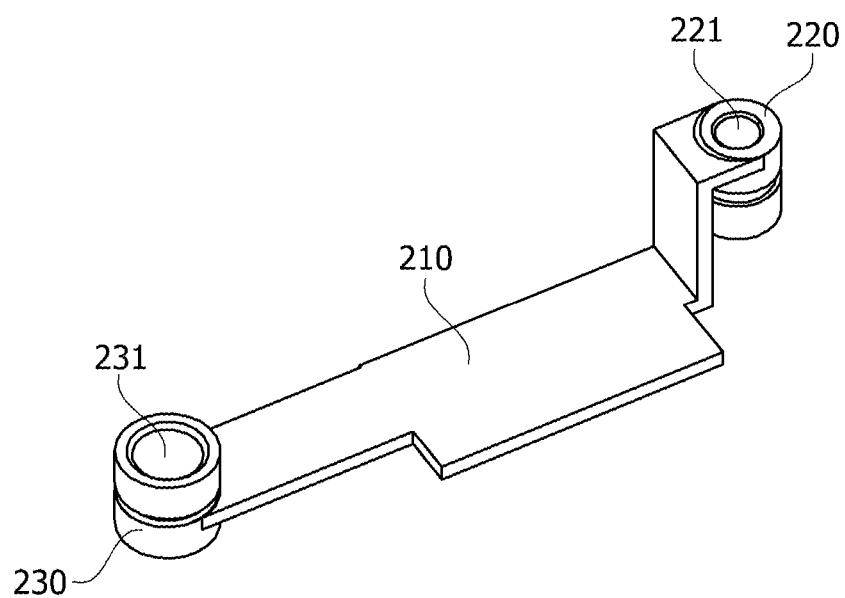
FIG. 4 is a view illustrating a grounding portion of a bracket.

FIG. 4 is a view illustrating a grounding portion of a bracket.

Although the second grounding portion 210, the third grounding portion 220, and the fourth grounding portion 230 have been described above as separate portions in terms of shapes and functions thereof with reference to FIGS. 3 and 4, they may be coupled to each other in a vertical direction to form one member. The second grounding portion 210, the third grounding portion 220, and the fourth grounding portion 230 may be formed of a conductive metal material. The second grounding portion 210, the third grounding portion 220, and the fourth grounding portion 230 may be double-injection molded to be coupled to the bracket 200.

The second grounding portion 210 may be in the form of a flat plate. The second grounding portion 210 is disposed in the accommodation portion 240. The second grounding portion 210 may be disposed on a lower surface of the bracket 200 to be exposed to the outside. The second grounding portion 210 is in contact with the first grounding portion 53 of the wire assembly 50 located in the accommodation portion 240.

The third grounding portion 220 may be a cylindrical member having a hole 221 at a center thereof, through which a fastening member passes. A fastening member for coupling the bracket 200 and the body 100 passes through the hole 221. The third grounding portion 220 may be inserted into the first fastening hole 250. The first fastening hole 250 is a place with which the bracket 200 is necessarily brought into contact so as to couple the body 100 to the bracket 200. A grounding structure for shielding EMI is obtained by disposing the third grounding portion 220 in the first fastening hole 250. Therefore, it is not necessary to additionally provide a grounding structure to bring the third grounding portion 220 into contact with the body 100. The third grounding portion 220 may be disposed at a side of the second grounding portion 210.

The fourth grounding portion 230 may be a cylindrical member having a hole 231 at a center thereof, through which a fastening member passes. A fastening member passes through the hole 231 to couple the bracket 200 and an EPS. The fourth grounding portion 230 may be inserted into the second fastening hole 260. The second fastening hole 260 is necessarily brought into contact with an EPS to couple the bracket 200 to the EPS. A grounding structure for shielding EMI is obtained by disposing the fourth grounding portion 230 in the second fastening hole 260. Therefore, it is not necessary to additionally provide a grounding structure to bring the fourth grounding portion 230 into contact with the EPS. The fourth grounding portion 230 may be disposed at another side of the second grounding portion 210.

Figure 5:
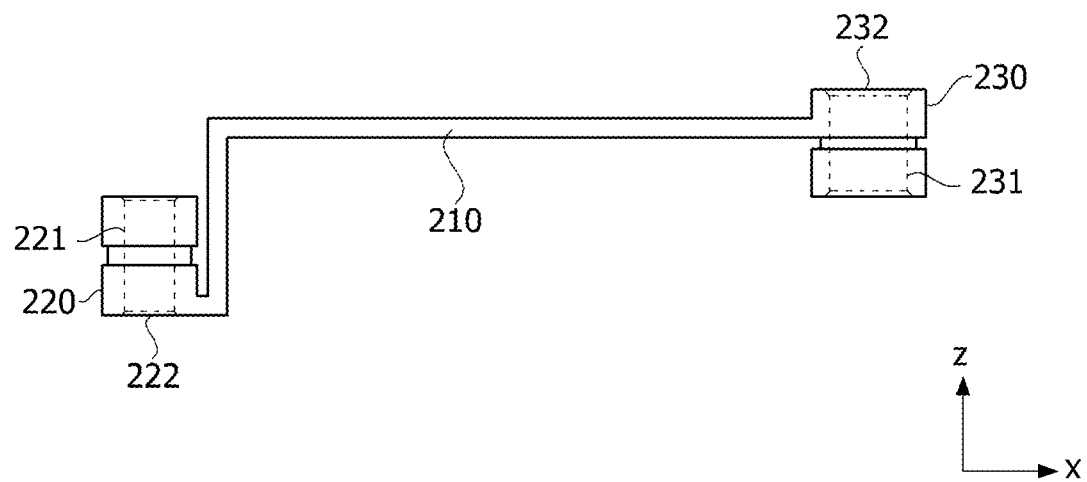
FIG. 5 is a front view of the grounding portion of the bracket of FIG. 4.

FIG. 5 is a front view of a grounding portion of the bracket of FIG. 4.

Referring to FIGS. 4 and 5, the third grounding portion 220 and the fourth grounding portion 230 may be disposed at different positions in a height direction (a Z-axis direction) with respect to the second grounding portion 210. In this case, the position of the third grounding portion 220 to be brought into contact with the body 100 of the housing 40 and the position of the fourth grounding portion 230 to be brought into an external device such as an EPS are considered.

Figure 6:
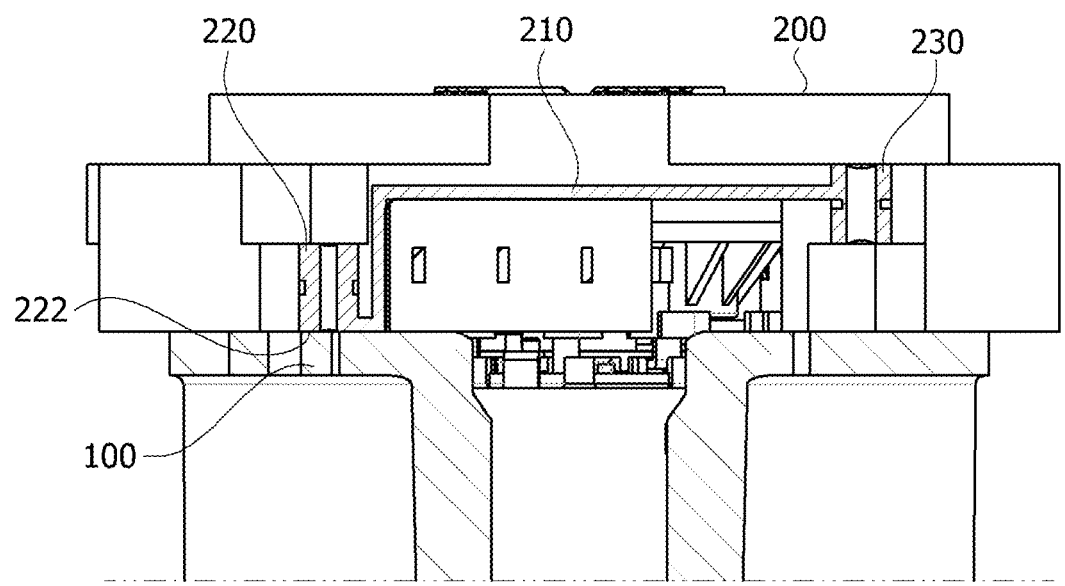
FIG. 6 is a side cross-sectional view of a bracket with grounding portions.

FIG. 6 is a side cross-sectional view of a bracket with grounding portions.

Referring to FIGS. 2, 5, and 6, when the bracket 200 is fastened to the body 100, a lower surface 222 of the third grounding portion 220 comes into contact with an upper end of the body 100 and thus is grounded while the first grounding portion 53 of the wire assembly 50 is in contact with the second grounding portion 210. In addition, when the motor is fastened to an EPS, the first grounding portion 53 of the wire assembly 50 comes into contact with the second grounding portion 210, the third grounding portion 220 comes into contact with the body 100, and an upper surface 232 of the fourth grounding portion 230 comes into contact with the EPS system and thus is grounded. Therefore, EMI may be shielded even in the bracket 200 formed of a plastic resin which does not conduct electric current.

Figure 7:
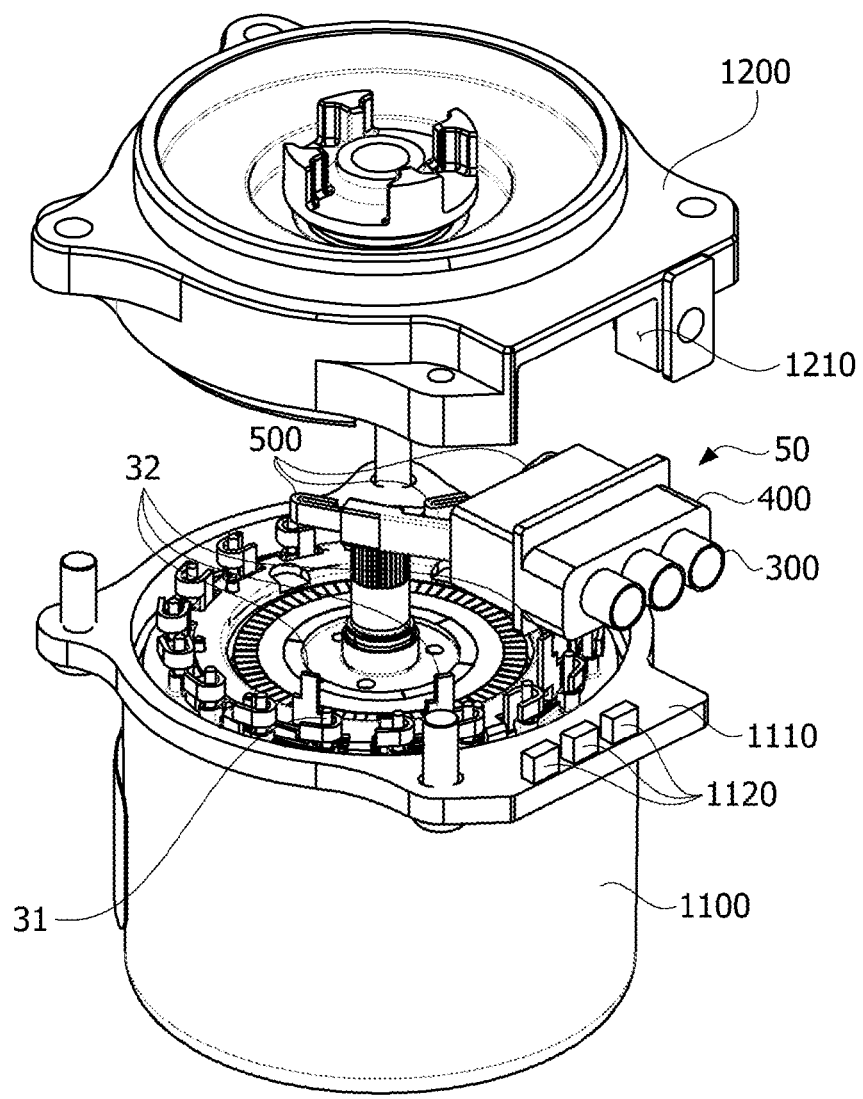
FIG. 7 is an exploded view of a motor according to another embodiment.
Figure 8:
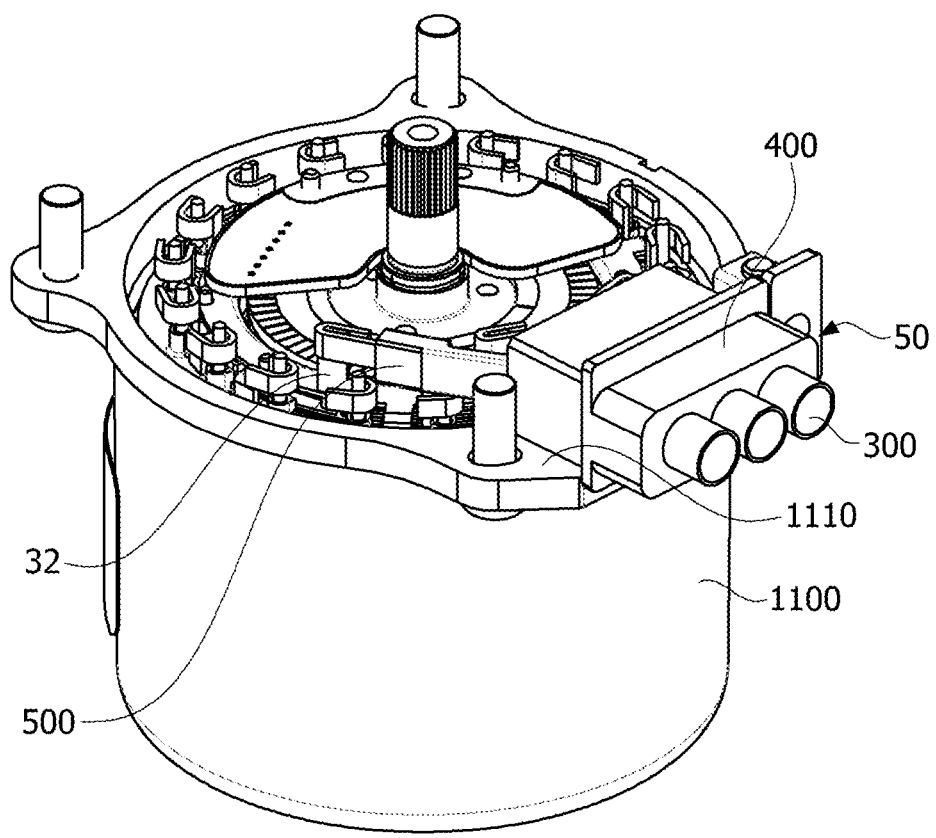
FIG. 8 is a view of a wire assembly mounted on an upper portion of a body of a housing of the motor of FIG. 7.

FIG. 7 is an exploded view of a motor according to another embodiment. FIG. 8 is a view of a wire assembly mounted on an upper end of a body of a housing of the motor of FIG. 7.

Referring to FIGS. 7 and 8, a wire assembly 50 is placed on an upper surface of a body 1100. The bracket 1200 may include an accommodation portion 1210 for accommodating the wire assembly 50. A space into which a grommet 400 of the wire assembly 50 is inserted is secured using the accommodation portion 1210.

Figure 9:
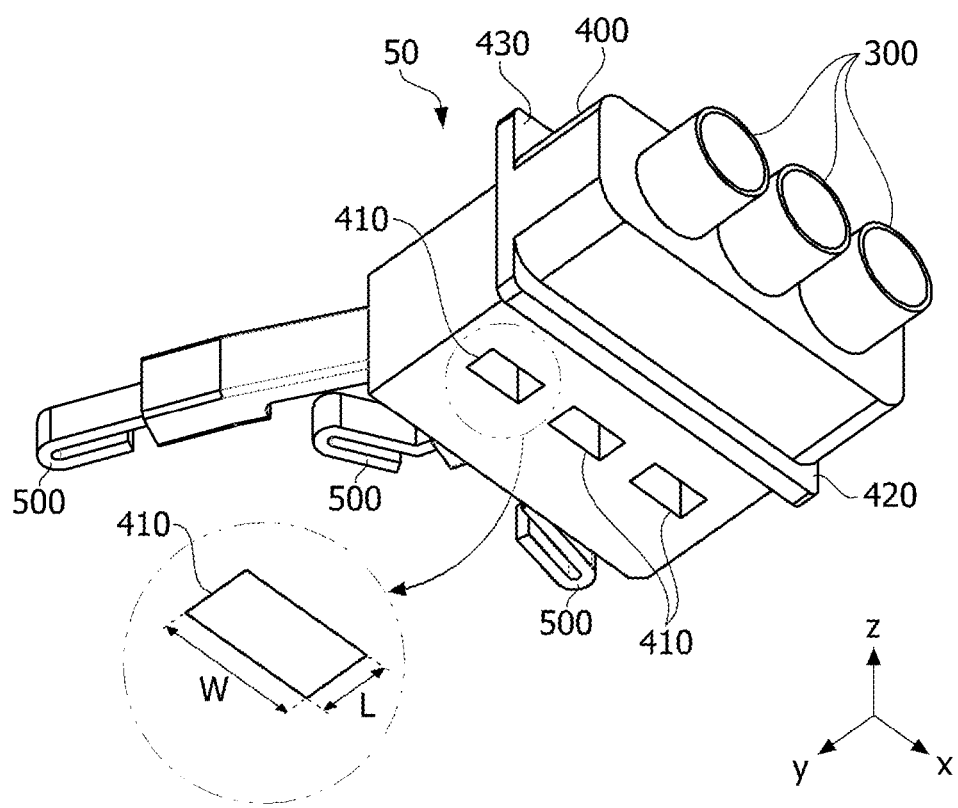
FIG. 9 is a bottom view of a wire assembly.

FIG. 9 is a bottom view of a wire assembly.

Referring to FIGS. 8 and 9, the wire assembly 50 may include holes 410. The holes 410 are provided in a lower surface of the grommet 400. Three holes 410 corresponding to three cables 300 may be provided. The three holes 410 may be aligned in a width direction of the grommet 400 (an X-axis direction in FIG. 9).

Figure 10:
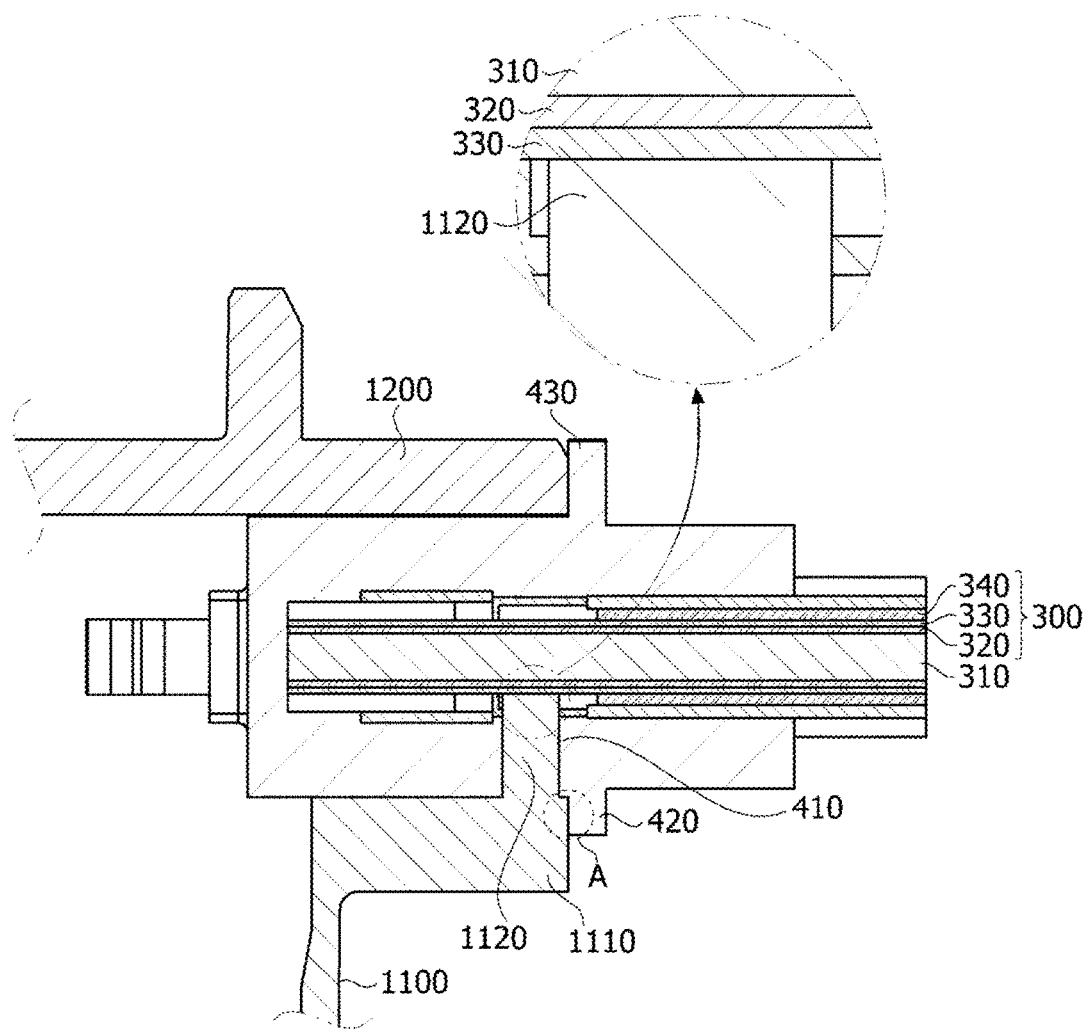
FIG. 10 is a side cross-sectional view of the inside of a grommet of a wire assembly.

FIG. 10 is a side cross-sectional view of the inside of a grommet of a wire assembly.

Referring to FIGS. 9 and 10, the grommet 400 of the wire assembly 50 accommodates a cable 300 therein. The cable 300 may include a core 310, an insulating layer 320, a shield layer 330, and a sheath layer 340. The core 310 refers to a metal portion through which current flows. The insulating layer 320 is provided at an outer side of the core 310 to cover the core 310 so as to withstand an operating voltage and fix the core 310. The shield layer 330 is provided at an outer side of the insulating layer 320 to inhibit influences caused by an electric field or a magnetic field and may be formed of a copper wire woven in a net shape.

A fore-end of the cable 300 is disposed inside the grommet 400 by partially removing the sheath layer 340 to expose the shield layer 330. The holes 410 are formed to penetrate from the lower surface of the grommet 400 to a position in the grommet 400 in which the cable 300 is accommodated. The shield layer 330 of the cable 300 is disposed to be exposed via the holes 410.

Referring to FIG. 7, the body 1100 of the housing 40 may include an extending portion 1110. The extending portion 1110 may extend outward from an upper end of the body 1100. Protruding portions 1120 are provided on the extending portion 1110. The protruding portions 1120 protrude upward from the extending portion 1110 to be fitted into the holes 410 of the grommet 400. As illustrated in FIG. 8, when the wire assembly 50 is seated on the extending portion 1110, the protruding portions 1120 are fitted into the holes 410, thereby fixing the body 1100 and the wire assembly 50 with each other. Therefore, adhesion between the body 1100 and the wire assembly 50 may be greatly increased without a separate coupling structure.

The protruding portions 1120, when fitted into the holes 410, come into contact with the shield layer 330 of the cable 300. Since the body 1100 and the shield layer 330 of the cable 300 are electrically connected to each other via the protruding portions 1120, it is not necessary to provide a separate gasket so as to shield EMI. Therefore, a grounding structure of the motor may be simplified.

Three protruding portions 1120 may be provided to correspond to the number of holes 410. Each of the protruding portions 1120 is in contact with one of the shield layers 330 of the three cables 300.

The grommet 400 may include a lower cover portion 420 and an upper cover portion 430. The lower cover portion 420 protrudes from the lower surface of the grommet 400 to be in contact with a side surface of the extending portion 1110 as shown in a portion A in FIG. 10. The lower cover portion 420 inhibits water or foreign substances from flowing into a gap between the lower surface of the grommet 400 and the extending portion 1110. When a configuration in which a plurality of holes 410 are provided in the lower surface of the grommet 400 is considered, the motor may be seriously damaged when water or foreign substances flow into the gap between the lower surface of the grommet 400 and the extending portion 1110. The lower cover portion 420 may cover a boundary between the lower surface of the grommet 400 and the extending portion 1110 to physically inhibit water or foreign substances from flowing into the holes 410 or the inside of the motor.

The upper cover portion 430 protrudes to extend from an upper surface of the grommet 400 to be in contact with a side surface of the bracket 1200. The upper cover portion 430 may cover a boundary between the upper surface of the grommet 400 and the bracket 1200 to physically inhibit water or foreign substances from flowing into the motor.

Figure 11:
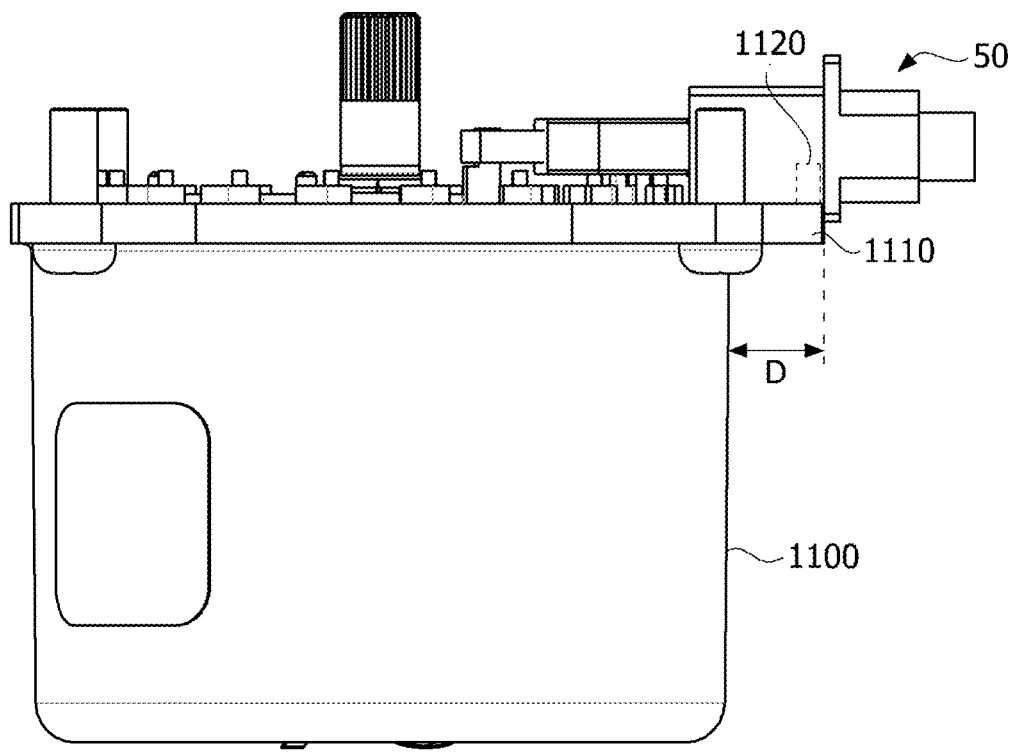
FIG. 11 is a side view of a body of a motor.

FIG. 11 is a side view of a body of a motor.

Referring to FIGS. 9 and 11, the holes 410 may be provided in a longitudinal direction. A width W of the hole 410 in a width direction of the grommet 400 may be greater than a length L thereof in a longitudinal direction (a Y-axis direction in FIG. 9) of the grommet 400.

This ensures a contact area between the protruding portion 1120 and the shield layer 330 of the cable 300 while minimizing a length of the extending portion 1110 indicated by an arrow D of FIG. 11 and ensures adhesion between the body 1100 and the wire assembly 50. When the length L of the hole 410 is increased to increase the size of the protruding portion 1120 and the length D of the extending portion 1110 is correspondingly increased, the size and weight of a product increase. The length D of the extending portion 1110 may be greatly reduced by configuring the hole 410 and a cross section of the protruding portion 1120 in a rectangular shape.

A motor according to an exemplary embodiment of the present invention has been particularly described above with reference to the accompanying drawings.

While the technical idea of the present invention has been described above with respect to examples thereof, it will be apparent to those of ordinary skill in the art that various modifications, changes and alternatives may be made without departing from the essential features of the invention. Therefore, the embodiments disclosed herein and the accompanying drawings are not intended to restrict the scope of the present invention and are only used for a better understanding of the present invention. The scope of the present invention is not limited by these embodiments and the accompanying drawings. The scope of protection of the present invention should be interpreted based on the following claims, and all technical ideas within a scope equivalent thereto should be construed as falling within the scope of the present invention.

The invention claimed is:

1. A motor comprising:
   a housing;
   a stator provided in the housing;
   a rotor provided in the stator;
   a shaft engaged with the rotor and extending in an axial direction of the motor; and
   a wire assembly coupled to the stator,
   wherein the wire assembly comprises a first grounding portion on a first surface thereof that faces away from the housing in the axial direction,
   wherein the wire assembly comprises three cables disposed on a second surface thereof that faces in a radial direction perpendicular to the axial direction,
   wherein the housing comprises:
      a body; and
      a bracket including a first fastening hole and provided on a first surface of the body that faces away from the wire assembly in the axial direction, and
   wherein the bracket comprises:
      a third grounding portion inserted into the first fastening hole to be in contact with the body; and
      a second grounding portion connected to the third grounding portion and disposed to be exposed at a second surface of the bracket, facing towards the wire assembly in the axial direction so as to be in contact with the first grounding portion.

2. The motor of claim 1, wherein the bracket comprises a second fastening hole, and
wherein the bracket comprises a fourth grounding portion connected to the second grounding portion and inserted into the second fastening hole to be in contact with an external device.

3. The motor of claim 2, wherein the third grounding portion and the fourth grounding portion are disposed at different positions in the axial direction with respect to the second grounding portion.

4. A motor comprising:
a housing;
a stator provided in the housing;
a rotor provided in the stator;
a shaft engaged with the rotor and extending in an axial direction of the motor; and
a wire assembly coupled to the stator,
wherein the wire assembly comprises a first grounding portion,
wherein the housing comprises:
a body; and
a bracket including a first fastening hole and provided on a first surface of the body that faces away from the wire assembly in the axial direction,
wherein the bracket comprises:
a third grounding portion inserted into the first fastening hole to be in contact with the body; and
a second grounding portion connected to the third grounding portion and disposed to be exposed at a second surface of the bracket, facing towards the wire assembly in the axial direction so as to be in contact with the first grounding portion,
wherein the bracket comprises a second fastening hole,
wherein the bracket comprises a fourth grounding portion connected to the second grounding portion and inserted into the second fastening hole to be in contact with an external device, and
wherein each of the third grounding portion and the fourth grounding portion comprises a hole through which a fastening member passes.

5. The motor of claim 4, wherein the third grounding portion and the fourth grounding portion are disposed at different positions in the axial direction with respect to the second grounding portion.

6. A motor comprising:
a housing;
a stator provided in the housing;
a rotor provided in the stator;
a shaft engaged with the rotor and extending in an axial direction of the motor; and
a wire assembly coupled to the stator,
wherein the wire assembly comprises a first grounding portion,
wherein the housing comprises:
a body; and
a bracket including a first fastening hole and provided on a first surface of the body that faces away from the wire assembly in the axial direction,
wherein the bracket comprises:
a third grounding portion inserted into the first fastening hole to be in contact with the body; and
a second grounding portion connected to the third grounding portion and disposed to be exposed at a second surface of the bracket, facing towards the wire assembly in the axial direction so as to be in contact with the first grounding portion,
wherein the bracket comprises a second fastening hole,
wherein the bracket comprises a fourth grounding portion connected to the second grounding portion and inserted into the second fastening hole to be in contact with an external device,
wherein the bracket comprises an accommodation portion that accommodates the wire assembly, and
wherein the second grounding portion is provided in the accommodation portion.

7. The motor of claim 6, wherein the third grounding portion and the fourth grounding portion are disposed at different positions in the axial direction with respect to the second grounding portion.

* * * * *